(12) United States Patent
Hanson et al.

(10) Patent No.: US 7,549,842 B2
(45) Date of Patent: Jun. 23, 2009

(54) APPARATUS FOR HOUSING AN AIR MOVING UNIT

(75) Inventors: Oved W. Hanson, Carrollton, TX (US); Mark R. Hogan, Plano, TX (US); Robert B. Uselton, Plano, TX (US)

(73) Assignee: Lennox Manufacturing, Inc., Richardson, TX (US)

( * ) Notice: Subject to any disclaimer, the term of this patent is extended or adjusted under 35 U.S.C. 154(b) by 538 days.

(21) Appl. No.: 11/356,502

(22) Filed: Feb. 17, 2006

(65) Prior Publication Data

US 2007/0197156 A1   Aug. 23, 2007

(51) Int. Cl.
  *F04D 29/54*  (2006.01)
(52) U.S. Cl. .................. 415/204; 415/206; 454/184
(58) Field of Classification Search .......... 415/203, 415/204, 206, 224; 454/184
See application file for complete search history.

(56) References Cited

U.S. PATENT DOCUMENTS

| | | | | |
|---|---|---|---|---|
| 1,659,410 | A * | 2/1928 | Schmidt ............... | 415/204 |
| 1,940,344 | A * | 12/1933 | Broderick ............ | 415/201 |
| 3,407,995 | A * | 10/1968 | Kinsworthy .......... | 415/94 |
| 3,856,431 | A * | 12/1974 | Tucker ................ | 417/350 |
| 3,937,369 | A | 2/1976 | Seals | |
| 5,141,397 | A | 8/1992 | Sullivan | |
| 5,156,524 | A | 10/1992 | Forni | |
| 5,257,904 | A | 11/1993 | Sullivan | |
| 5,474,422 | A | 12/1995 | Sullivan | |
| 5,738,167 | A | 4/1998 | Asbjornson et al. | |
| 5,875,562 | A * | 3/1999 | Fogarty .............. | 34/97 |
| 6,579,060 | B1 | 6/2003 | Mann, III et al. | |
| 6,662,588 | B2 | 12/2003 | Houk et al. | |
| 6,886,630 | B2 | 5/2005 | Onda et al. | |
| 2004/0253092 | A1 | 12/2004 | Hancock | |
| 2004/0253098 | A1 | 12/2004 | Hancock | |
| 2004/0253101 | A1 | 12/2004 | Hancock | |
| 2005/0042078 | A1 | 2/2005 | Sturgell | |

\* cited by examiner

*Primary Examiner*—Edward Look
*Assistant Examiner*—Aaron R Eastman
(74) *Attorney, Agent, or Firm*—Law Office of Donald D. Mondul

(57) ABSTRACT

A housing cooperates with an air mover rotating about a rotation axis to move air received from an approach to an exhaust. The approach is generally oriented about a direction intersecting the housing at upstream and downstream limits. The housing presents an interior surface establishing radii between the axis and the surface. The radii have a generally constant radial value across a width in planes containing the axis in a first zone between the downstream limit and a first locus, and in a second zone between a second locus and the exhaust. The radii vary between a smallest and a largest radius across the width in planes containing the axis in a variance zone upstream of the axis. The smallest radius is less than the radial value at the first and second loci. The largest radius is larger than the radial value at one of the first and second loci.

14 Claims, 2 Drawing Sheets

APPARATUS FOR HOUSING AN AIR MOVING UNIT

BACKGROUND OF THE INVENTION

The present invention is directed to air moving or air handling units, and especially to air handling devices in which blower housing apparatuses are contained, such as in an HVAC (Heating Ventilating Air Conditioning) system.

Air handling units for HVAC systems are typically constrained in their physical dimensions to conform with predetermined industry standards. The relevant industry standards are predicated, at least in part, upon a requirement that some components of HVAC systems must be amenable to installation in a residential attic, closet or other restricted space. Such space-restricted components must, therefore, be restricted to a particular "footprint" and be passable through an access opening to the attic, closet or other restricted space. Space utilization within such components is therefore a constraint in their design. Air handling units for use in a residential HVAC system are, by way of example and not by way of limitation, among such components.

Typical air handling units include an evaporator unit and a blower unit. In some air handling units if a blower unit is placed too close to an associated evaporator unit a problem is created because condensate can be entrained in high velocity air flow from the evaporator unit through the blower unit and cause water damage in the space served by the HVAC system, such as a home or an office. A contributing factor to this problem is the typical bluff shape presented by the housing containing the blower unit to approaching air from the evaporator unit. The bluff shape restricts the air flow channel as the air flows from the evaporator, between the blower housing and a surrounding cabinet, through the blower unit and to the exhaust area of the air handling unit. Such a restricting of air flow area increases speed of the air flow and thereby permits entrained moisture to be carried through the air handling unit to the area being serviced by the HVAC system. As a result of these factors, blower housings are typically placed a separation distance from evaporator units to permit entrained moisture to fall out of air before the air enters the blower unit. Such a design occupies space unnecessarily. Further, the restricted air flow required by such designs contributes to lower static pressure performance and lower efficiency.

There is a need for a design for an air handling unit that occupies no greater "footprint" than presently dictated by industry standards, that still passes through predetermined openings such as openings accessing attics, closets or other restricted spaces, and that permits freer air flow to enhance static pressure performance and efficiency without entraining moisture in flowing air provided to a serviced area.

SUMMARY OF THE INVENTION

A housing cooperates with an air mover rotating about a rotation axis to move air received from an approach to an exhaust. The approach is generally oriented about an axis intersecting the housing at upstream and downstream limits. The housing presents an interior surface establishing radii between the axis and the surface. The radii have a generally constant radial value across a width in planes containing the axis in a first zone between the downstream limit and a first surface locus, and in a second zone between a second surface locus and the exhaust. The radii vary between a smallest and a largest radius across the width in planes containing the axis in a variance zone upstream of the axis. The smallest radius is less than the radial value at the first and second surface loci. The largest radius is larger than the radial value at at least one of the first and second surface loci.

It is, therefore, an object of the present invention to provide an air handling unit that occupies no greater "footprint" than presently dictated by industry standards, that still passes through predetermined openings such as openings accessing attics, closets or other restricted spaces, and that permits freer air flow to enhance static pressure performance and efficiency without entraining moisture in flowing air to a serviced area Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

The term "locus" is intended herein to indicate a place, location, locality, locale, point, position, site, spot, volume, juncture, junction or other identifiable location-related zone in one or more dimensions. A locus in a physical apparatus may include, by way of example and not by way of limitation, a corner, intersection, curve, line, area, plane, volume or a portion of any of those features. A locus in an electrical apparatus may include, by way of example and not by way of limitation, a terminal, wire, circuit, circuit trace, circuit board, wiring board, pin, connector, component, collection of components, sub-component or other identifiable location-related area in one or more dimensions.

Figure 1:
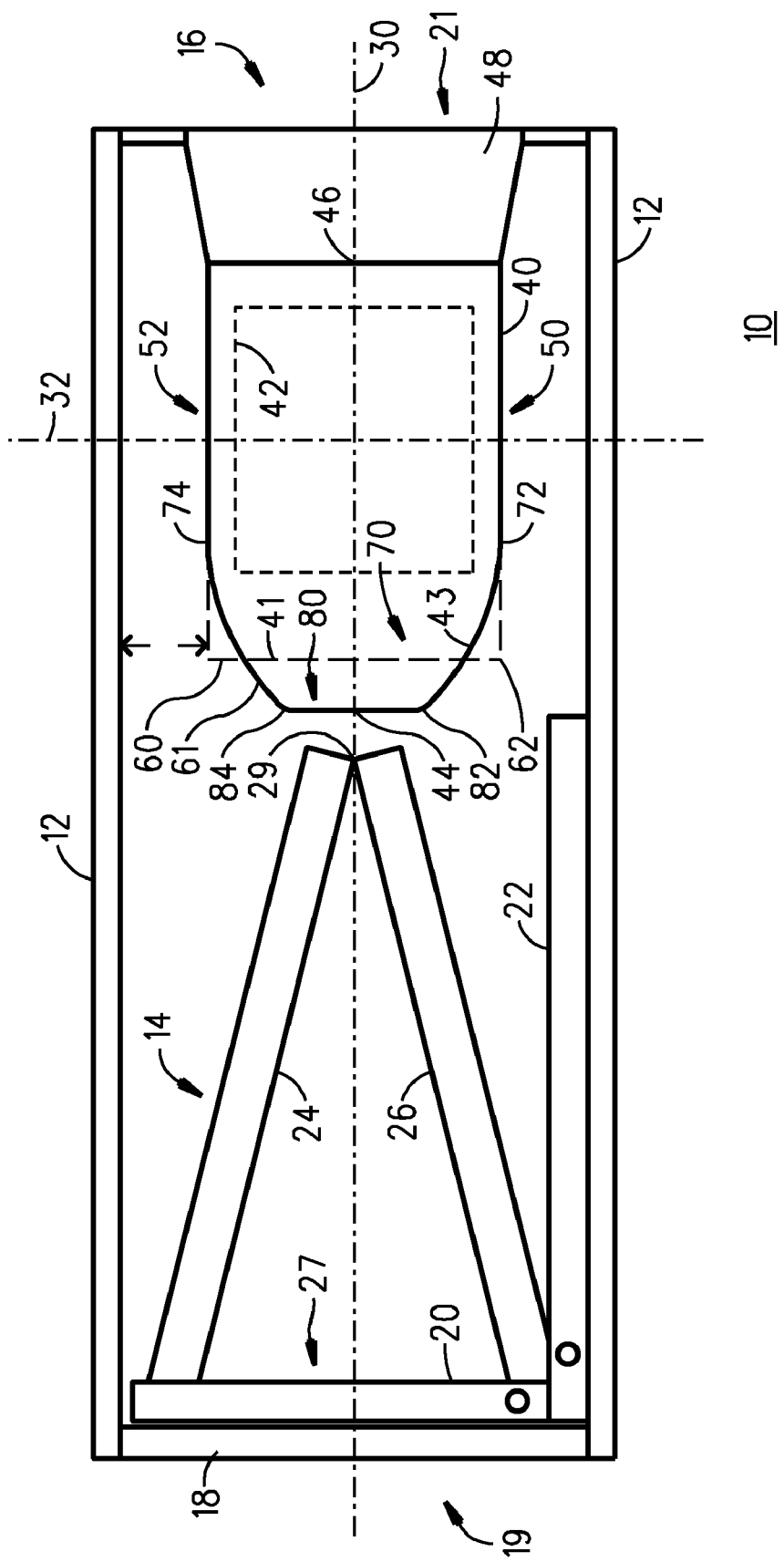
FIG. 1 is a schematic diagram of representative air handling equipment in which the present invention may be advantageously employed.

FIG. 1 is a schematic diagram of representative air handling equipment in which the present invention may be advantageously employed. In FIG. 1, a representative residential air handling unit 10 is of the sort of air handling unit appropriate, by way of example and not by way of limitation, for use with a heat pump HVAC system. Air handling unit 10 is enclosed in a cabinet 12 and includes an evaporator device 14 and an air handling device or blower device 16. Evaporator device 14 and blower device 16 are situated generally symmetrically with respect to a flow axis 30. An air filter 18 closes a first end 19 of cabinet 12.

Drain pans 20, 22 permit operation of air handling unit 10 with flow axis 30 oriented vertically with blower device 16 above evaporator device 14 or operation of air handling unit 10 in a horizontal orientation with flow axis 30 oriented horizontally.

Evaporator device 14 includes a first evaporating panel 24 and a second evaporating panel 26. Evaporating panels 24, 26 generally span drain pan 22 and are arranged generally in a "V" structure having an open end 27 generally spanning drain pan 20 and an apex 29 generally situated at flow axis 30.

Blower device 16 includes a housing 40 containing a fan 42. Fan 42 rotates about an axis 32 and is substantially centered on flow axis 30. Flow axis 30 intersects housing 40 at an upstream limit 44 and at a downstream limit 46. Housing 40 has an exhaust locus 48 substantially spanning second end 21 of cabinet 12. Housing 40 also has a first input locus 50 and a second input locus 52. Input loci 50, 52 provide air passages generally centered on axis 32. Fan 42 operates to draw air through air filter 18 in a flow or approach direction generally symmetrical with respect to flow axis 30. As air encounters housing 40 generally at upstream limit 44 and across portions of housing 40 facing upstream toward first end 19, air is routed between housing 40 and cabinet 12 to enter housing 40 through input loci 50, 52 in a flow direction generally parallel with axis 32. Air flow may not reach exact parallelism with respect to axis 32, but general parallelism with axis 32 is achieved until fan 42 redirects air outward from axis 32 in a radial flow direction generally perpendicular with axis 32 against the inner wall 41 of housing 40.

In order to facilitate understanding the present invention, air handling unit 10 is illustrated in FIG. 1 representing housing 40 using prior art construction and using construction according to the teachings of the present invention. Prior art construction of housing 40 provided a bluff face 60 (indicated in dotted line format in FIG. 1) so that a clearance gap $\Delta$ was established between housing 40 and cabinet 12. Bluff face 60 typically was formed using a substantially rectangular cross-section, as indicated in FIG. 1, so that corners such as corner 62 generated turmoil in air flow past housing 40, restricted air flow from evaporator device 14 to fan 42. Such restriction of air flow increased air flow velocity in regions between housing 40 and cabinet 12 and adversely affected static pressure performance and efficiency of air handling unit 10. Prior art construction required a minimum spacing between bluff face 60 and apex 29 to ensure moisture would not be entrained in air traversing blower device 16 to enter a space being serviced by an HVAC system employing air handling unit 10. By way of example and not by way of limitation, a distance on the order of four inches was required between bluff face 60 and apex 29 to achieve the desired operating characteristics without undesired levels of entrained moisture in air traversing blower device 16.

It is preferred that housing 40 present an inner surface 41 with respect to axis 32 in a generally Archimedian or logarithmic scroll structure. It is known that larger volute expansion angles in such structures allow a blower wheel such as fan 42 to achieve higher static pressure for a given flow rate and that blower efficiency improves with increased expansion angle in the range of expansion angles employed in air moving units used with HVAC systems (generally, by way of example and not by way of limitation, expansion angles in the range of seven to fifteen degrees). Space constraints imposed by industry standards (discussed generally above) preclude simply providing larger expansion angles as a solution.

The inventors have discovered that by providing a smoother face to approaching air by housing 40, less turmoil is imparted to air flowing past housing 40 en route to input loci 50, 52 and less restriction of air flow between housing 40 and cabinet 12 is presented. A contoured face 61 is provided to establish a gradual transition of air flow from evaporator device 14 around housing 40 and into input loci 50, 52. Also provided is a change to inner wall structure of housing 40 to present a revised inner surface 43. Revised inner surface 43 establishes a variance zone 70 between a first zone-edge 72 and a second zone-edge 74. It is preferred that variance zone 70 be substantially centered on flow axis 30. It is further preferred that variance zone 70 include a smaller blunting zone 80 between a first blunting-zone-edge 82 and a second blunting-zone-edge 84. It is preferred that blunting zone 80 be substantially centered on flow axis 30.

Variance zone 70 and blunting zone 80 cooperate to provide a clearance with cabinet 12 that is greater than clearance gap $\Delta$ provided by prior art bluff face 60. Providing the outer profile necessary to accommodate variance zone 70 and blunting zone 80 also accommodates providing revised inner surface 43. Revised inner surface 43 permits providing a larger volute expansion angle than may be provided by bluff face 60 and inner surface 41 in the same "footprint" area occupied by air handling unit 10. Providing such a larger expansion angle at least between zone-edges 72, 74 allows fan 42 to achieve higher static pressure for a given flow rate and improved blower efficiency as compared with prior art bluff face 60 and inner surface 41. Further details describing the improved structure of the present invention are provided below in connection with FIG. 2.

Figure 2:
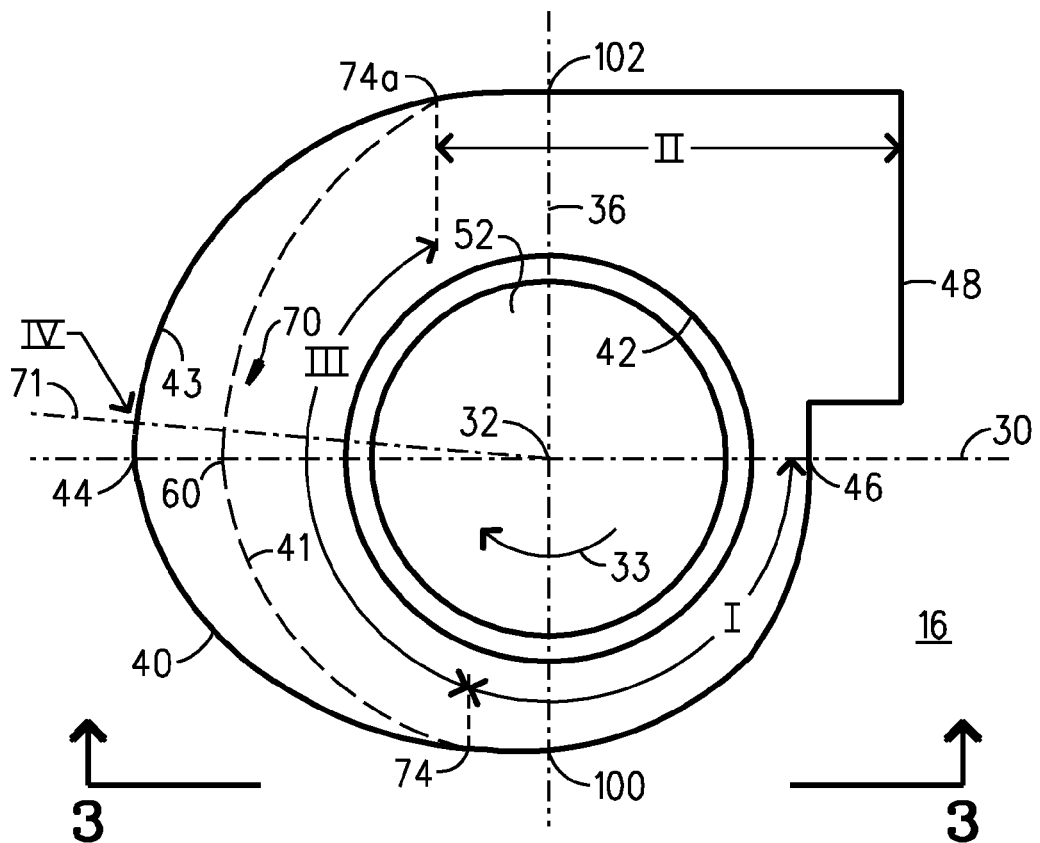
FIG. 2 is a side view of an air handling unit employing the teachings of the present invention.
Figure 3:
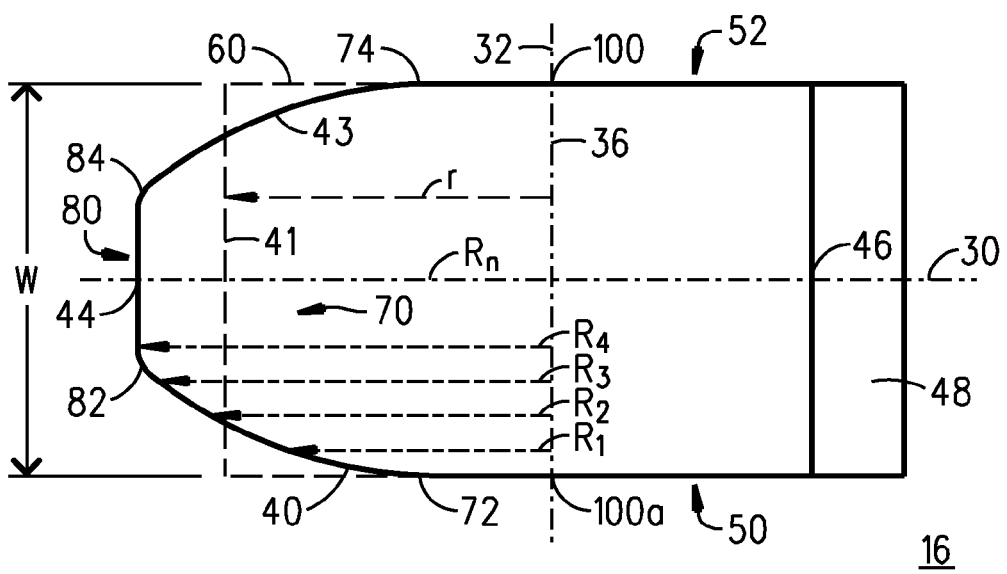
FIG. 3 is a bottom view of the air handling unit illustrated in FIG. 2 taken in direction 3-3 in FIG. 2.

FIG. 2 is a side view of an air handling unit employing the teachings of the present invention. FIG. 3 is a bottom view of the air handling unit illustrated in FIG. 2 taken in direction 3-3 in FIG. 2. Regarding FIG. 2 and FIG. 3 together, blower device 16 includes housing 40 containing fan 42. Fan 42 rotates about axis 32 and is substantially centered on flow axis 30. Flow axis 30 intersects housing 40 at an upstream limit 44 and at a downstream limit 46. A plane 36 containing axis 32 and substantially perpendicular with axis 30 establishes housing intersection loci 100, 102 (FIG. 2) and 100a (FIG. 3). Another housing intersection locus is also established behind locus 102 (FIG. 2) and behind locus 100a (FIG. 3) but is not visible in FIGS. 2 and 3. Housing 40 includes exhaust locus 48 and input loci 50, 52. Input loci 50, 52 provide air passages generally centered on axis 32. Fan 42 operates to draw air in a flow or approach direction generally symmetrical with respect to flow axis 30. As air encounters housing 40 generally at upstream limit 44 and across portions of housing 40 facing upstream, air is routed between housing 40 and cabinet 12 (not shown in FIGS. 2 and 3; see FIG. 1) to enter housing 40 through input loci 50, 52 in a flow direction generally parallel with axis 32. Air flow may not reach exact parallelism with respect to axis 32, but general parallelism with axis 32 is achieved until fan 42 redirects air outward from axis 32 in a radial flow direction generally perpendicular with axis 32 against inner wall 43 of housing 40. In the exemplary blower unit 16 of FIGS. 2 and 3, fan 42 rotates about axis 32 in a rotation direction indicated by an arrow 33.

In order to facilitate understanding the present invention, blower device 16 is illustrated in FIGS. 2 and 3 representing housing 40 using prior art construction and using construction according to the teachings of the present invention. Prior art construction of housing 40 provided a bluff face 60 (indicated in dotted line format) which typically formed a substantially rectangular cross-section so that distance from axis 32 to interior surface 41 of prior art blower housing 40 (using bluff face 60) is a constant value r across the width W (see FIG. 3) of blower housing 40 in planes containing axis 32.

The present invention provides interior surface 43 so that a plurality of radii $R_1$, $R_2$, $R_3$, $R_4$, $R_n$ generally perpendicular with rotational axis 32 between axis 32 and interior surface 43 define inner surface 43 in planes containing axis 32 in variance zone 70 between zone-edges 72, 74. An example of such a plane containing axis 32 is plane 71 (FIG. 2). Still referring to FIG. 2, radii generally perpendicular with rotational axis 32 in planes containing axis 32 are substantially constant across width W in a first flow sub-zone I between downstream limit 46 and a first housing locus or zone-edge 74 (embodying herein a first zonal boundary), and in a second flow sub-zone II from a second housing locus or zone-edge 74a (embodying herein a second zonal boundary) toward exhaust locus 48 in so far as the desired Archimedian or logarithmic scroll structure is maintained. Radial lengths will likely vary among various planes containing axis 32 that are outside variance zone 70 to establish the desired expansion angle for housing 40 with respect to fan 42, as will be understood by those skilled in the art. It is preferred that zone edges 74, 74a be established generally in the vicinity of plane 36 that establishes housing intersection loci 100, 102 and other housing intersection loci not visible in FIG. 2, as described above. In the exemplary structure illustrated in FIG. 2, zone edges 74, 74a are established upstream of plane 36.

Thus, in FIG. 3, radii $R_n$ have a relationship: $R_1 < R_2 < R_3 < R_4 < R_n$. Variance zone 70 presents a third flow sub-zone III. The portion of variance zone 70 between upstream limit 44 and second zone-edge 74 is preferably configured substantially as a mirror-image of the portion of variance zone 70 between first zone-edge 72 and upstream limit 44. Some radii $R_n$ are smaller than radius r, such as, by way of example and not by way of limitation, radii $R_1$, $R_2$. Other radii $R_n$ are larger than radius r, such as, by way of example and not by way of limitation, radii $R_3$, $R_4$, $R_n$. By this variable radii construction, a larger expansion angle may be provided for a portion of the flow zone within housing 40 from downstream limit 46, through upstream limit 44 and toward exhaust locus 48. Larger volute expansion angles in such structures allow a blower wheel such as fan 42 to achieve higher static pressure for a given flow rate and improve blower efficiency.

It is preferred that variance zone 70 be substantially centered on flow axis 30. It is further preferred that variance zone 70 include a smaller blunting zone 80 in a fourth flow sub-zone IV between a first blunting-zone-edge 82 and a second blunting-zone-edge 84. It is preferred that blunting zone 80 be substantially centered on flow axis 30.

Variance zone 70 and blunting zone 80 cooperate to provide a clearance with cabinet 12 (FIG. 1) that is greater than clearance gap Δ provided by prior art bluff face 60. Providing the output profile necessary to accommodate variance zone 70 and blunting zone 80 also accommodates providing a larger volute expansion angle than may be provided by bluff face 60 and inner surface 41 and still fit in the available blower compartment space occupied by blower device 16. Providing such a larger expansion angle at least between zone-edges 72, 74 (FIG. 3) allows fan 42 to achieve higher static pressure for a given flow rate and improved blower efficiency as compared with prior art housing structures using bluff face 60 and inner surface 41.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An improved housing apparatus for a blower device configured for employment in a cabinet; said blower device including an air moving unit rotating within the housing apparatus about a rotation axis; the housing apparatus having a width; said air moving unit being generally centered within said width; the housing apparatus being configured for cooperating with said cabinet to effect receiving an air stream generally symmetrically oriented about a flow axis; said flow axis being generally perpendicular with said rotation axis and generally centered on said width; the housing apparatus having at least one input locus and at least one exhaust locus; the housing apparatus cooperating with said air moving unit to move air from said at least one input locus to said at least one exhaust locus; the housing apparatus intersecting said flow axis at an upstream limit and at a downstream limit; the improvement comprising: said housing apparatus having an interior surface establishing a plurality of radii between said rotation axis and said interior surface generally perpendicular with said rotation axis; said plurality of radii having a respective generally constant radial value generally across said width in a respective plane containing said rotation axis in a first zone between said downstream limit and a first edge of a variance zone of said interior surface and in a second zone from a second edge of said variance zone toward said exhaust locus; and said plurality of radii changing generally across said width in said variance zone in respective planes containing said rotation axis between a smallest radius and a largest radius; said smallest radius being less than said constant radial value at at least one of said first edge and said second edge; said largest radius being larger than said constant radial value at at least one of said first edge and said second edge.

2. An improved housing apparatus for a blower device configured for employment in a cabinet as recited in claim 1 wherein said variance zone is substantially centered on said upstream limit.

3. An improved housing apparatus for a blower device configured for employment in a cabinet as recited in claim 1 wherein a blunting zone is established within said variance zone; said plurality of radii being generally constant at said largest radius generally across said blunting zone in each said respective plane.

4. An improved housing apparatus for a blower device configured for employment in a cabinet as recited in claim 3 wherein said variance zone is substantially centered on said upstream limit.

5. An improved blower apparatus including an air moving device within a housing having at least one intake locus and at least one exhaust locus; said air moving device being configured for rotation about an axis in a rotation direction; said air moving device operating to intake air generally parallel with said axis at said at least one intake locus and exhaust air radially generally perpendicular with said axis; said housing cooperating with said air moving device to encounter air at an upstream limit from a direction generally perpendicular with said axis, to direct received air toward said at least one intake locus and to direct exhausted air from said air moving device toward said exhaust locus; the improvement comprising: configuring said housing with an interior wall establishing an air flow zone and establishing a plurality of radii generally perpendicular with said axis between said axis and said interior surface; said plurality of radii having a generally constant radial value in respective planes containing said axis generally across a width in a first flow sub-zone on one side of said axis between a downstream limit of said interior wall generally opposite from said upstream limit and a first zonal boundary situated between said downstream limit and said upstream limit in said rotation direction and in a second flow sub-zone from a second zonal boundary toward said exhaust locus; said second zonal boundary being situated between said upstream limit and said exhaust locus; and said plurality of radii changing in respective planes containing said axis generally across said width between a smallest radius and a largest radius within a third flow sub-zone between said first zonal boundary and said second zonal boundary; said smallest radius being less than said constant radial value at at least one of said first zonal boundary and said second zonal boundary; said largest radius being larger than said constant radial value at at least one of said first zonal boundary and said second zonal boundary.

6. An improved blower apparatus as recited in claim 5 wherein said third flow sub-zone is substantially centered on said upstream limit.

7. An improved blower apparatus as recited in claim 5 wherein a fourth flow sub-zone is established within said third flow sub-zone; said plurality of radii being generally constant at said largest radius in respective planes containing said axis generally across said fourth flow sub-zone.

8. An improved blower apparatus as recited in claim 7 wherein said third flow sub-zone is substantially centered on said upstream limit.

9. An improved blower apparatus as recited in claim 8 wherein said fourth flow sub-zone is substantially centered on said upstream limit.

10. An apparatus for housing an air moving unit; said air moving unit rotating within a housing about a rotation axis; said air moving unit cooperating with the housing to move air received from an approach direction to an exhaust locus of the housing; said approach direction being generally symmetrical with an axis generally perpendicular with said rotation axis and intersecting the housing at an upstream limit and at a downstream limit; the apparatus comprising: a shell structure containing said air moving unit and presenting an interior surface establishing a plurality of radii generally perpendicular with said rotation axis between said rotation axis and said interior surface; said plurality of radii having a respective generally constant radial value generally across a width in a respective plane containing said rotation axis in a first zone on one side of said rotation axis between said downstream limit and a first housing locus of said interior surface and in a second zone from a second housing locus of said interior surface toward said exhaust locus; and said plurality of radii varying generally between a smallest radius and a largest radius across said width in respective planes containing said rotation axis in a variance zone extending from upstream of said rotation axis generally to said rotation axis; said smallest radius being less than said constant radial value at at least one of said first housing locus and said second housing locus; said largest radius being larger than said constant radial value at at least one of said first housing locus and said second housing locus.

11. An apparatus for housing an air moving unit as recited in claim 10 wherein said variance zone is substantially centered on said upstream limit.

12. An apparatus for housing an air moving unit as recited in claim 10 wherein a blunting zone is established within said variance zone; said plurality of radii being generally constant at said largest radius generally across said blunting zone in each said respective plane.

13. An apparatus for housing an air moving unit as recited in claim 12 wherein said variance zone is substantially centered on said upstream limit.

14. An apparatus for housing an air moving unit as recited in claim 13 wherein said blunting zone is substantially centered on said upstream limit.

* * * * *